United States Patent
Banerjee et al.

(10) Patent No.: US 7,243,678 B2
(45) Date of Patent: Jul. 17, 2007

(54) FUEL FILL SYSTEM WITH FUEL VAPOR RECIRCULATION

(75) Inventors: Raja Banerjee, Springfield, MO (US); Darrell L. Klein, Springfield, MO (US)

(73) Assignee: Dayco Products, LLC, Miamisburg, OH (US)

( * ) Notice: Subject to any disclaimer, the term of this patent is extended or adjusted under 35 U.S.C. 154(b) by 304 days.

(21) Appl. No.: 10/766,142

(22) Filed: Jan. 27, 2004

(65) Prior Publication Data

US 2005/0161095 A1 Jul. 28, 2005

(51) Int. Cl.
*B60K 15/04* (2006.01)

(52) U.S. Cl. ............... 137/587; 137/808; 141/286; 220/86.2

(58) Field of Classification Search ........... 137/587, 137/588, 808, 812; 123/516; 141/59, 286, 141/290; 220/86.2
See application file for complete search history.

(56) References Cited

U.S. PATENT DOCUMENTS

| | | | |
|---|---|---|---|
| 3,664,360 A * | 5/1972 | Royle et al. ............... 137/812 |
| 3,907,153 A * | 9/1975 | Mutty ....................... 220/86.2 |
| 3,979,010 A * | 9/1976 | Fiedler et al. ............. 220/86.2 |
| 4,113,300 A * | 9/1978 | Schenk ..................... 296/97.22 |
| 4,341,322 A * | 7/1982 | Heinke ....................... 220/210 |
| 5,503,199 A * | 4/1996 | Whitley et al. ............. 141/286 |
| 5,606,954 A * | 3/1997 | Yamazaki et al. .......... 123/516 |
| 5,769,057 A * | 6/1998 | Hashimoto et al. ......... 123/516 |
| 5,947,153 A | 9/1999 | Bucci et al. |
| 5,950,655 A * | 9/1999 | Benjey ....................... 137/587 |
| 6,293,312 B1 | 9/2001 | Stripe |
| 6,347,639 B1 * | 2/2002 | Thompson .................. 137/587 |
| 6,523,582 B2 * | 2/2003 | Furuta ........................ 141/286 |
| 6,591,871 B2 | 7/2003 | Smith et al. |
| 6,880,593 B1 * | 4/2005 | Swane ....................... 220/86.2 |
| 2002/0134461 A1 * | 9/2002 | Furuta ........................ 141/286 |

* cited by examiner

*Primary Examiner*—John Rivell
(74) *Attorney, Agent, or Firm*—Joseph V. Tassone; Thompson Hine LLP

(57) ABSTRACT

A fuel fill system includes a funnel having an inlet port configured to receive a nozzle from an external fuel source, a fuel filler tube coupled to an outlet port of the funnel, and a vapor recirculation tube coupled to the funnel. Fuel vapor entering the funnel from the vapor recirculation tube is directed toward the outlet port at a first angle less than 90° from a longitudinal axis of the funnel. The fuel vapor entering the funnel may also be directed at a second angle less than 90° from a line tangent to an inner surface of the funnel at a point where fuel vapor enters the funnel. The second angle being in a plane perpendicular to the longitudinal axis of the funnel.

17 Claims, 4 Drawing Sheets

PATH LINES COLORED BY VELOCITY MAGNITUDE (M/S)

PATH LINES COLORED BY VELOCITY MAGNITUDE (M/S)

VELOCITY VECTORS COLORED BY VELOCITY MAGNITUDE (M/S)

US 7,243,678 B2

FUEL FILL SYSTEM WITH FUEL VAPOR RECIRCULATION

BACKGROUND

This invention relates to fuel fill systems in motor vehicles. More particularly, this invention relates to fuel fill systems having fuel vapor recirculation features.

Fuel fill systems are found in motor vehicles such as automobiles, trucks, boats, airplanes, and the like, and serve to transfer fuel provided by a source external to the vehicle (e.g., a gas pump) to a fuel storage tank located in the vehicle. In general, fuel fill systems include a funnel assembly, called a fuel filler neck, connected to the fuel storage tank by one or more lengths of tube. The fuel filler neck receives fuel delivered from the external fuel source, and the one or more lengths of tube deliver the fuel to the fuel storage tank. A removable cap (e.g., a gas cap) is secured to the fuel filler neck to seal the fuel fill system after the fueling process.

Environmental regulations imposed on the automotive industry and on the fuel delivery industries severely limit the amount of fuel vapor that can permeate from the fuel fill system of motor vehicles. To help meet and exceed these regulations, various improvements in technology have been developed. For example, various types of vapor permeation resistant tubing have been proposed to limit the amount of fuel vapor that can permeate from the system through the tubing. Examples of such tubing are provided in U.S. Pat. No. 6,591,871, entitled "Low Permeation Polybutylene Terephthalate and Polybutylene Napthalate Fuel and Vapor Tubes"; and in U.S. Pat. No. 6,293,312, entitled "Thermoplastic Tubing".

In addition to advancements in the materials used in fuel fill systems, advancements have been made in the design of fuel fill systems. One example of an advancement in the design of fuel fill systems is found in so-called Onboard Refueling Vapor Recovery (ORVR) equipped fuel fill systems. ORVR equipped fuel fill systems include a vapor recirculation tube, which provides a separate fluid path between the fuel storage tank and the fuel filler neck. The recirculation tube provides a path for receiving the air and fuel vapor mixture (referred to hereinafter as "fuel vapor") displaced from the fuel storage tank during fueling, and reintroduces the displaced fuel vapor to the fuel filler neck. The flow of the fuel vapor in the vapor recirculation tube may be controlled by one or more valves, and may be filtered by one or more filters.

While innovations such as vapor permeation resistant tubing and ORVR equipped systems significantly reduce the amount of fuel vapor that is allowed to escape from a fuel fill system, further reductions are desired.

BRIEF SUMMARY OF THE INVENTION

The above-described and other drawbacks and deficiencies of the prior art are overcome or alleviated by a fuel fill system comprising a funnel having an inlet port configured to receive a nozzle from an external fuel source, a fuel filler tube coupled to an outlet port of the funnel, and a vapor recirculation tube coupled to the funnel. Fuel vapor from the vapor recirculation tube enters the funnel through a fuel vapor port, and the fuel vapor port directs the fuel vapor toward the outlet port. In one embodiment, the fuel vapor port is directed at a first angle less than 90° from a longitudinal axis of the funnel. The first angle is preferably between about 20° to about 70°, and more preferably between about 30° to about 60°.

In another aspect of the invention, the fuel vapor entering the funnel is directed at a second angle less than 90° from a line tangent to an inner surface of the funnel at a point where fuel vapor enters the funnel. The angle is in a plane perpendicular to the longitudinal axis of the funnel. In one embodiment, the fuel vapor port has a centerline disposed at the second angle. The second angle is preferably between about 20° to about 70°, and more preferably between about 30° to about 60°.

The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

The invention will be more fully understood from the following detailed description taken in conjunction with the accompanying drawings wherein like elements are numbered alike, and in which.

DETAILED DESCRIPTION

Figure 1:
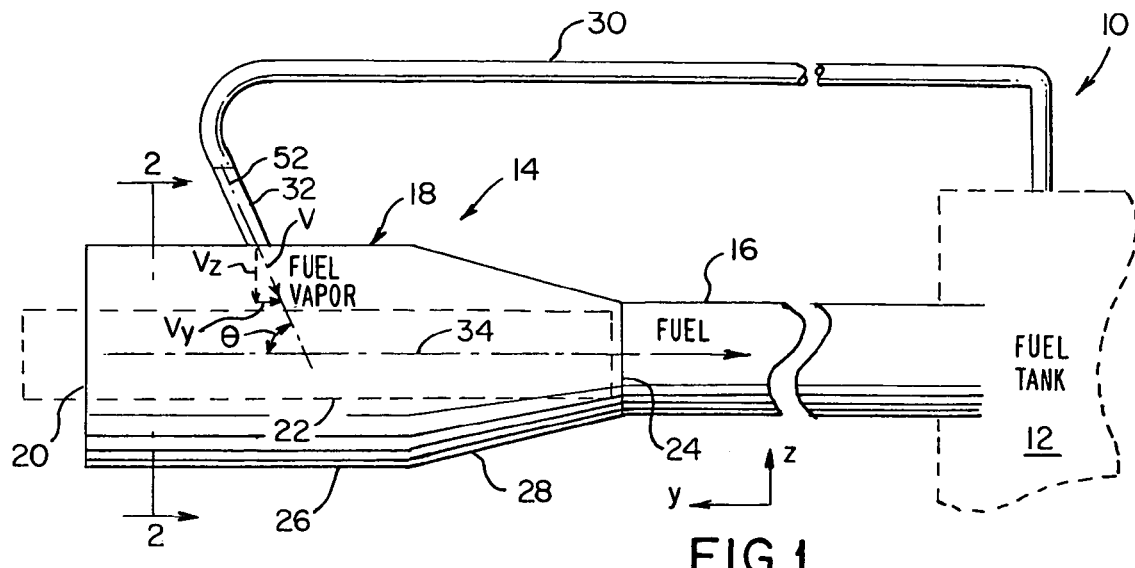
FIG. 1 is a side view of a fuel fill system of the present invention.
Figure 2:
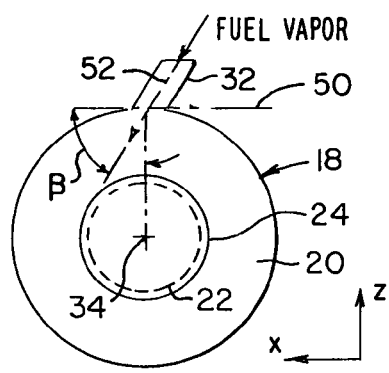
FIG. 2 is a cross-sectional end view of the fuel fill system taken along line 2-2 of FIG. 1.

FIG. 1 and FIG. 2 depict side and cross-sectional end views, respectively, of a fuel fill system 10 in accordance with an embodiment of the present invention. Fuel fill system 10 may be used in motor vehicles such as automobiles, trucks, boats, airplanes, and the like, and serves to transfer fuel provided by an external source (e.g., a gas pump) to a fuel storage tank 12 located in the vehicle.

Fuel fill system 10 includes a fuel filler neck 14 connected to the fuel storage tank by one or more lengths of tube 16. The fuel filler neck 14 is typically elevated relative to the fuel storage tank 10 so that fuel within the fuel filler neck 14 flows under the force of gravity through the tube 16 to the fuel storage tank 12. The fuel filler neck 14 includes a funnel 18 having an inlet port 20 configured to receive a nozzle 22 from the external fuel source, and an outlet port 24 coupled to the tube 16. In the embodiment shown, funnel 18 has a cylindrical portion 26, the end of which forms the inlet port 20, connected to a conical portion 28, the end of which forms the outlet port 24. The tube 16 is secured to the funnel 18 at the outlet port 24. Fuel fill system 10 also includes a vapor recirculation tube 30, which provides a separate fluid path between the fuel storage tank 10 and the funnel 18. Fuel vapor from the vapor recirculation tube 30 enters the funnel 18 through a fuel vapor port 32. Preferably, the various components of the fuel fill system 10 are manufactured from a vapor permeation resistant plastic material.

In operation, the fuelling process typically includes inserting the nozzle 22 into the funnel 18 through the inlet port 20 of the funnel 18, and dispensing fuel from the nozzle 22 such that it flows through the outlet port 24 of the nozzle 18 and through the one or more tubes 16 into the fuel storage tank 12. The vapor recirculation tube 30 provides a path for receiving the fuel vapor displaced from the fuel storage tank 12 during fueling, and reintroduces the displaced fuel vapor to the funnel 18 via the fuel vapor port 32. Advantageously, the fuel vapor port 32 directs fuel vapor toward the outlet port 24. By directed "toward the outlet port", it is meant that the fuel vapor is directed by the fuel vapor port 32 such that the main current of the fuel vapor has a velocity component in the direction of the outlet port 24. For example, in the embodiment of FIG. 1, the fuel vapor exiting the fuel vapor port 32 is directed at an angle θ relative to a longitudinal axis 34 of the cylindrical portion 26 of the funnel 18, which provides the fuel vapor with a velocity component ($V_z$) perpendicular to the longitudinal axis 34 and a velocity component ($V_y$) parallel to the longitudinal axis 34 and toward the outlet port 24. As will be discussed in further detail hereinafter, this arrangement will force the fuel vapor to be introduced towards the fuel flowing from the nozzle 22 and thereby aid in the entrainment of the fuel vapor in the fuel. In addition, this arrangement will impede the flow of any reverse flowing air in the tube 16.

Referring to FIG. 2 the fuel vapor port 32 directs the fuel vapor entering the funnel 18 at an angle β less than 90° from a line 50 tangent to an inner surface of the funnel 18 at a point where fuel vapor enters the funnel 18. The angle β is in a plane perpendicular to the longitudinal axis 34 of the funnel 18. This arrangement will provide the main current of fuel vapor with a velocity component $V_x$, which directs the vapor around the inside surface of the funnel 18 to introduce a low pressure region and vortex within the funnel 18. The low pressure region and vortex result in a reduction in the pressure within much of the funnel 18 when the fuel vapor is flowing downstream along with the fuel from the nozzle 22 and aid in the entrainment of fuel vapor into the fuel.

In the embodiment of FIGS. 1 and 2, the fuel vapor port 32 is a substantially straight conduit having a centerline 52 disposed at the angle θ in the y-z plane shown in FIG. 1, and at the angle β in the x-z plane shown in FIG. 2. The generally straight conduit aligns the flow of the fluid with the centerline 52, such that when the fluid exits the port 32 into the funnel 18, the velocity (V) of its main current is directed substantially along the centerline 52 at the angles θ and β. While the angles θ and β may be any angle less than 90°, to facilitate manufacturing of the funnel 18, the angles θ and β are each preferably between about 20° to about 70°, and more preferably between about 30° to about 60°.

Figure 3:
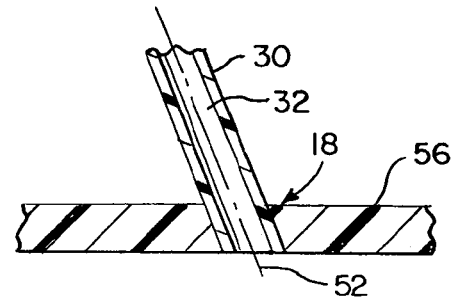
FIG. 3 is a cross-sectional view of a first embodiment of a fuel vapor port.
Figure 4:
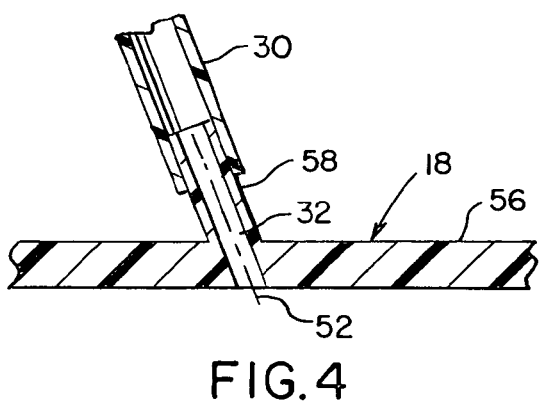
FIG. 4 is a cross-sectional view of a second embodiment of a fuel vapor port.
Figure 5:
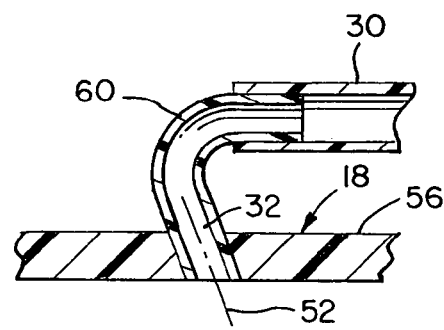
FIG. 5 is a cross-sectional view of a third embodiment of a fuel vapor port.

FIGS. 3 through 5 depict various embodiments of the fuel vapor port 32. In FIG. 3, the fuel vapor port 32 is formed by an inner surface of an end portion of the vapor recirculation tube 30, which extends through a side 56 of the funnel 18. The outer perimeter of the vapor recirculation tube 30 is secured to the side 56 of the funnel 18 by any convenient means, such as adhesive, welding, and the like. In FIG. 4, the fuel vapor port 32 is formed by a portion of the funnel 18.

In the example shown, the funnel 18 includes a cylindrical protrusion 58 that extends from the side 56 of the funnel 18. The cylindrical protrusion 58 receives the end of the vapor recirculation tube 30 for attaching the tube 30 to the funnel 18. The vapor recirculation tube 30 may be secured to the protrusion 58 using any convenient means, such as press-fit, adhesives, brazing, welding, mechanical fastener (e.g., hose clamp), or the like. In FIG. 5, the fuel vapor port 32 is formed by a fitting 60, which connects the vapor recirculation tube 30 to the funnel 18. The fitting 60 may be a simple connection fitting, as shown, or may include various devices such as valves (e.g., check valves), filters or the like. The fitting 60 may be secured to the side 56 of the funnel 18 by any convenient means, such as adhesive, welding, and the like. Similarly, the vapor recirculation tube 30 may be secured to the fitting 60 using any convenient means, such as press-fit, adhesives, welding, mechanical fastener (e.g., hose clamp), or the like.

Figure 6:
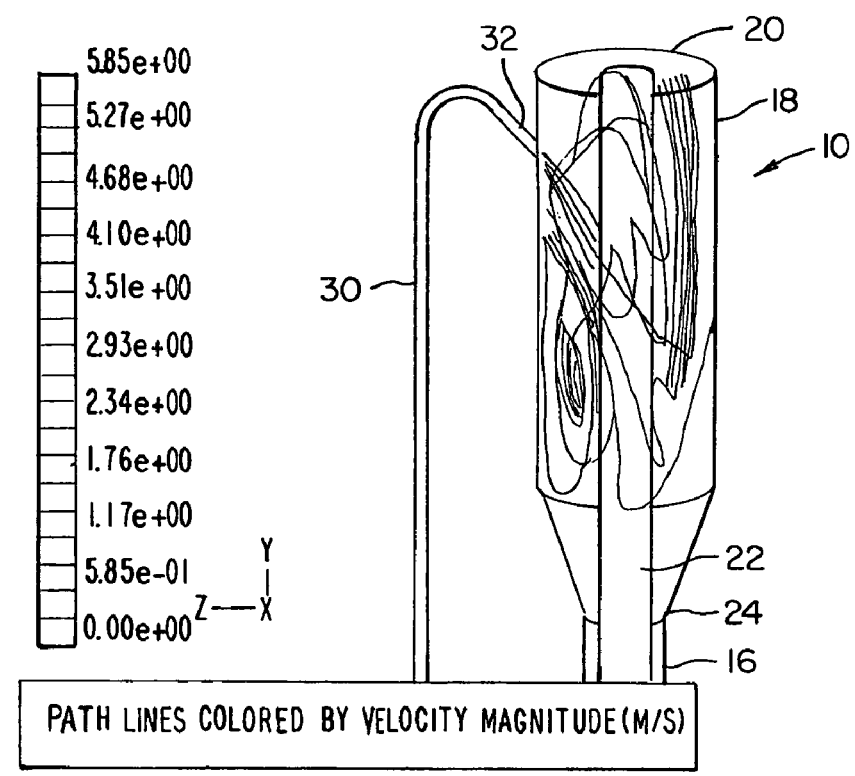
FIG. 6 is a computer-generated display of the path of fuel vapor particles in the fuel fill system of FIG. 1.
Figure 7:
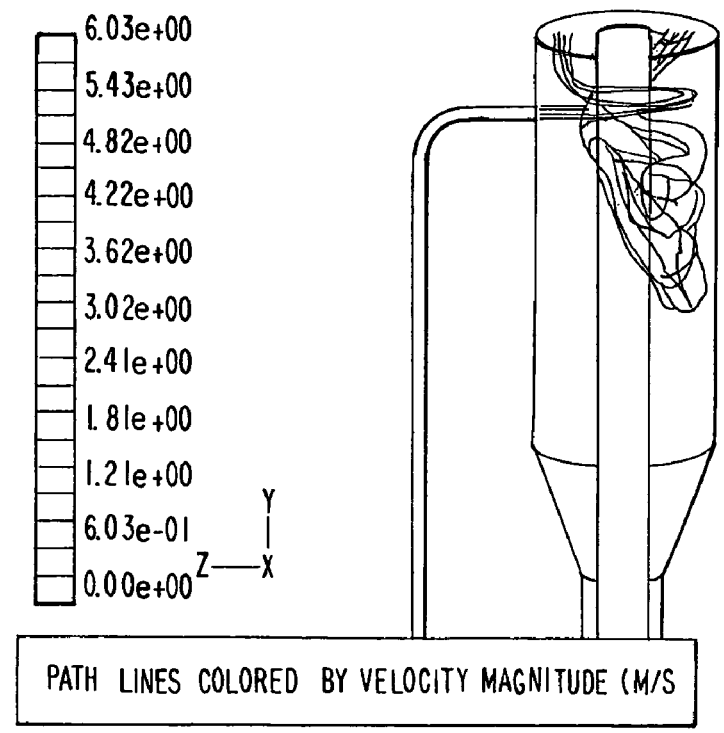
FIG. 7 is a computer-generated display of the path of fuel vapor particles in a prior art fuel fill system.

FIG. 6 and FIG. 7 depict the paths of fuel vapor particles in a fuel fill system 10 of the present invention and in a prior art fuel fill system, respectively. In the system of FIG. 6, the fuel vapor port 32 directs the fuel vapor toward the outlet port 24 at an angle θ of of about 55° in accordance with an embodiment of the present invention, while in FIG. 7 the fuel vapor port directs the fuel vapor perpendicular to the longitudinal axis of the funnel as is found in systems of the prior art. Each of FIGS. 6 and 7 were generated from a computational fluid dynamics (CFD) flow model of the respective systems. The modeling software used was Fluent 6.0 commercially available from Fluent, Inc. Lebanon, N.H. Each of the trace lines represent a vapor particle as it travels from the vapor port, through the funnel.

The boundary conditions for each of the systems modeled in FIGS. 6 and 7 are the same, and represent a condition where air pressure within the tube 16 is sufficiently high to impede the downstream flow of fuel vapor. Such conditions may exist due to an increased pressure within the fuel tank 12 (FIG. 2). Comparison of FIGS. 6 and 7, reveals that the system 10 of the present invention causes the fuel vapor particles to travel further downstream toward the liquid flowing from the nozzle 22 than does the prior art system of FIG. 7. As a result, the fuel fill system 10 of the present invention results in the entrainment of more fuel vapor into the fuel flowing from the nozzle 22. In addition, because the fuel vapor is introduced into the funnel 18 at a high velocity towards the outlet port 24, it also impedes the reverse flow of fuel vapor from the tube 16. As a result, the fuel fill system 10 of the present invention reduces the amount of fuel vapor that can escape from the system 10 to below that possible with fuel fill systems of the prior art.

Figure 8:
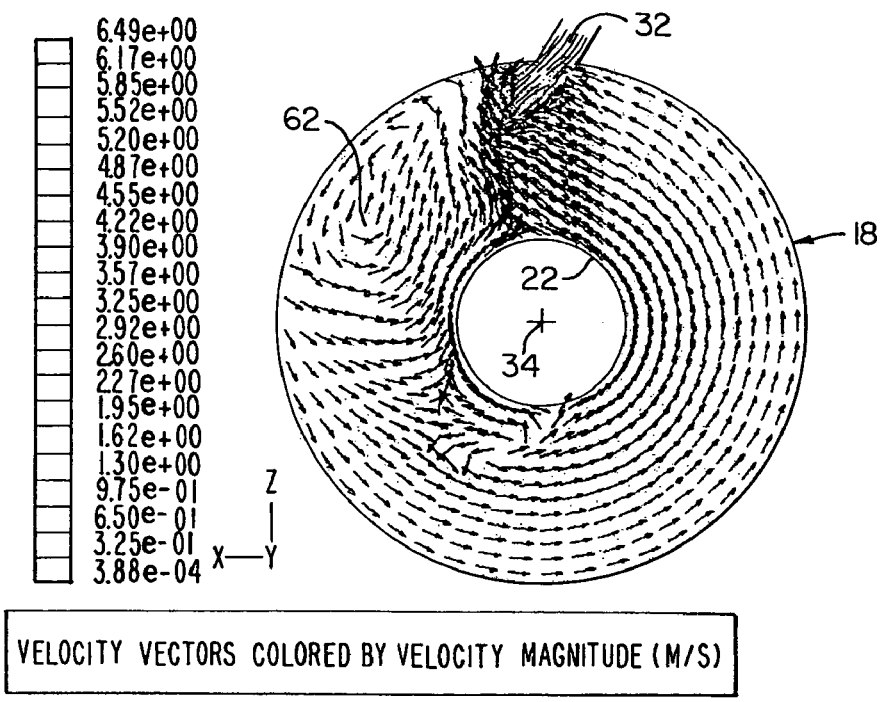
FIG. 8 is a computer-generated display indicating the velocity direction of fuel vapor in the fuel system of FIG. 1.
Figure 9:
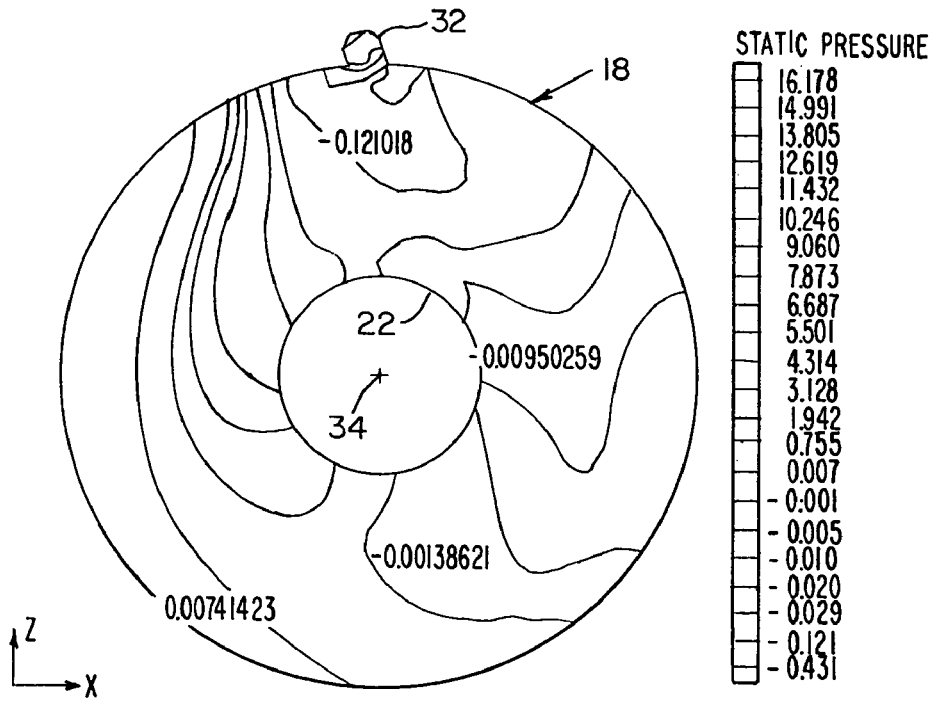
FIG. 9 is a computer-generated display indicating static pressure in the fuel system of FIG. 1.

FIGS. 8 and 9 are cross-sectional views of the fuel system 10 taken in a plane perpendicular to the longitudinal axis 34 of the funnel 18. In accordance with an embodiment of the present invention, the fuel vapor port 32 directs the fuel vapor entering the funnel 18 at an angle of about 45° from a line tangent to an inner surface of the funnel 18 at a point where fuel vapor enters the funnel 18. FIG. 8 depicts flow direction of fuel vapor in the funnel 18, where each arrow represents the velocity direction. FIG. 9 depicts static pressure at various regions of the funnel 18, with the numerical values indicating pressure relative to ambient pressure (i.e., pressure outside the funnel 18). FIGS. 8 and 9 were generated from a computational fluid dynamics (CFD) flow model of the fuel fill system 10. The modeling software used was Fluent 6.0 commercially available from Fluent, Inc. Lebanon, N.H.

As can be seen in FIG. 8, the angled fuel vapor port 32 introduces a swirl component 62 when the fuel vapor enters the funnel 18. As can be seen in FIG. 9, this swirl component 62 will create a low pressure region (below ambient pressure) throughout most of the funnel 18. This low pressure region will help to prevent fuel vapor from escaping the funnel 18. In addition, the angled fuel vapor port 32 induces a vortex in the flow of fuel vapor, which tends to draw the fuel vapor downward towards the fuel flowing from the nozzle 22 and, as a result, improves the entrainment of the fuel vapor into the flowing fuel.

The fuel vapor port 32 may be configured to induce either a clockwise or counterclockwise swirl component 62. Preferably, the direction of the swirl component 62 is selected such that it complements any swirl direction induced in the fuel vapor by other features of the fuel vapor port 32, bends in the tube 16, vapor recirculation tube 30 (FIG. 1), and/or fitting 60 (FIG. 5).

Figure 10:
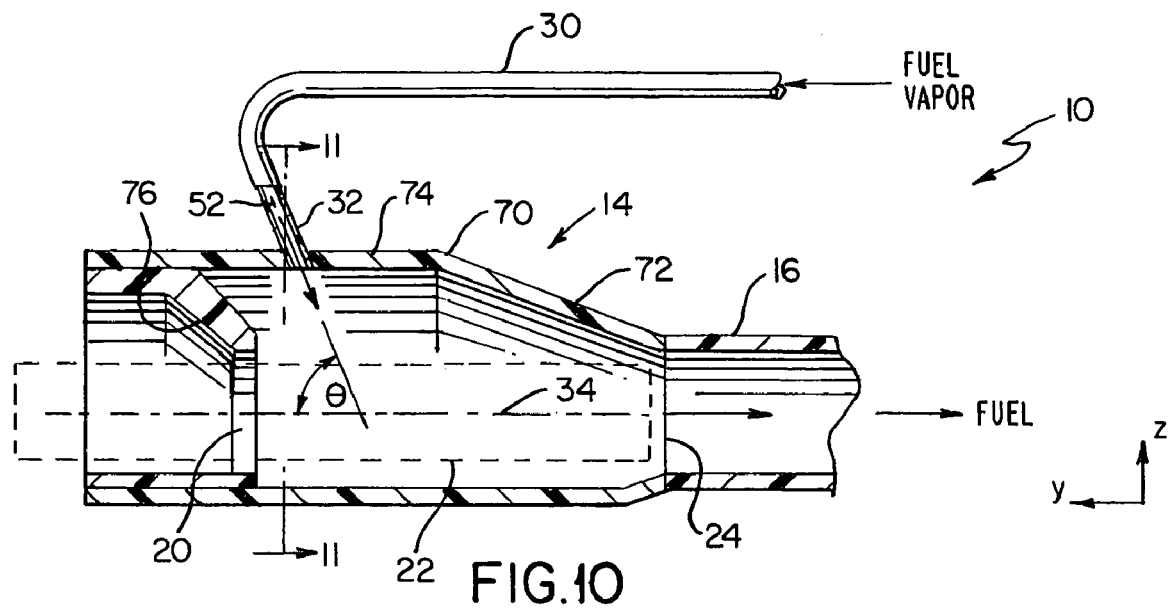
FIG. 10 is a cross-sectional side view of an alternative embodiment of the fuel fill system of the present invention.
Figure 11:
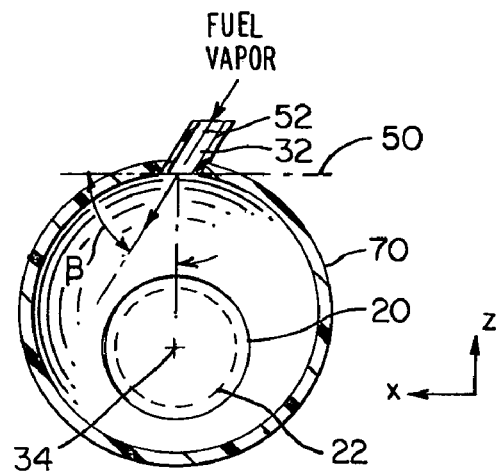
FIG. 11 is a cross-sectional end view of the fuel fill system taken along line 11-11 of FIG. 10.

FIG. 10 and FIG. 11 depict side and cross-sectional end views, respectively, of a fuel fill system 10 in accordance with an alternative embodiment of the present invention. Fuel fill system 10 is substantially similar to the fuel fill system 10 of FIGS. 1 and 2, with the exception being that the funnel 70 is of a different configuration than the funnel 18 of FIGS. 1 and 2. In FIGS. 10 and 11, the funnel 70 includes an asymmetric cone 72, the end of which forms the outlet port 24, coupled to a cylindrical portion 74. The funnel 70 also includes an inner cone 76 disposed within the cylindrical portion 74. The inner cone 76 forms the inlet port 20, which is configured to receive the nozzle 22 from the external fuel source. The inner cone 76 may serve to prevent fuel splash from exiting the fuel fill system 10. The cylindrical portion 74 has a longitudinal axis, as indicated at 34, which forms the longitudinal axis of the funnel 70.

The vapor recirculation line 30 is coupled to the funnel 70 using any convenient means, including those discussed herein with respect to FIGS. 1-5. The fuel vapor port 30 may be configured as discussed herein with reference to FIGS. 3-5. As in the previously discussed embodiments, the fuel vapor port 30 directs fuel vapor toward the outlet port 24 at an angle θ. In addition, the fuel vapor port 30 directs the fuel vapor entering the funnel 70 at an angle β less than 90° from a line 50 tangent to an inner surface of the funnel 70 at a point where fuel vapor enters the funnel 70.

In the fuel fill system 10 of the present invention, the fuel vapor port directs fuel vapor toward the outlet port. This arrangement causes the fuel vapor particles to travel further downstream toward the liquid surface, and therefore results in the entrainment of more fuel vapor into the fuel flowing from the nozzle than was previously possible with fuel fill systems of the prior art. Moreover, because the fuel vapor is introduced into the funnel at a high velocity towards the outlet port, it also impedes the reverse flow of fuel vapor from the tube, which reduces the amount of fuel vapor that can escape from the system to below that possible with fuel fill systems of the prior art. In addition, the fuel vapor port directs the fuel vapor entering the funnel at an angle β less than 90° from a line tangent to an inner surface of the funnel at a point where fuel vapor enters the funnel. This arrangement introduces a swirl component that creates a low pressure region (below ambient pressure) throughout most of the funnel, which further helps to prevent fuel vapor from escaping the funnel. This arrangement also induces a vortex in the flow of fuel vapor, which tends to draw the fuel vapor downward towards the flowing fluid (i.e., the fuel exiting the nozzle) and further improve the entrainment of the fuel vapor into the flowing fuel.

A number of embodiments of the present invention have been described. Nevertheless, it will be understood that various modifications may be made without departing from the spirit and scope of the invention. Accordingly, other embodiments are within the scope of the following claims.

What is claimed is:

1. A fuel fill system comprising:
   a funnel having an inlet port configured to receive a nozzle from an external fuel source;
   a fuel filler tube coupled to an outlet port of the funnel; and
   a vapor recirculation tube coupled to the funnel, wherein fuel vapor from the vapor recirculation tube enters the funnel through a fuel vapor port, and the fuel vapor port directs the fuel vapor toward the outlet port;
   wherein the funnel includes a cylindrical portion through which the fuel vapor port is disposed, the fuel vapor port has a centerline disposed at a first angle less than 90° from a longitudinal axis of the cylindrical portion; and
   wherein, in a plane perpendicular to a longitudinal axis of the funnel, the fuel vapor port further directs the fuel vapor at a second angle less than 90° from a line tangent to an inner surface of the funnel at a point where fuel vapor enters the funnel to introduce a swirl component in the fuel vapor around the inner surface of the funnel, which creates a low pressure region in the funnel to reduce the amount of fuel vapor that escapes the fuel fill system.

2. The fuel fill system of claim 1, wherein the fuel vapor port has a centerline disposed at the second angle.

3. The fuel fill system of claim 1, wherein the second angle is between about 20° to about 70°.

4. The fuel fill system of claim 3, wherein the second angle is between about 30° to about 60°.

5. A fuel fill system comprising:
   a funnel having an inlet port configured to receive a nozzle from an external fuel source;
   a fuel filler tube coupled to an outlet port of the funnel; and
   a vapor recirculation tube coupled to the funnel, wherein, in a plane perpendicular to a longitudinal axis of the funnel, the fuel vapor entering the funnel from the vapor recirculation tube is directed at a first angle less than 90° from a line tangent to an inner surface of the funnel at a point where the fuel vapor enters the funnel to introduce a swirl component in the fuel vapor around the inner surface of the funnel, which creates a low pressure region in the funnel to reduce the amount of fuel vapor that escapes the fuel fill system.

6. The fuel fill system of claim 5, further comprising:
   a fuel vapor port disposed through the funnel and in fluid communication with the vapor recirculation tube, the fuel vapor port having a centerline disposed at the first angle.

7. The fuel fill system of claim 6, wherein the centerline of the fuel vapor port is further disposed at a second angle less than 90° from the longitudinal axis of the funnel to direct the fuel vapor toward the outlet port.

8. The fuel fill system of claim 7, wherein each of the first and second angles is between about 20° to about 70°.

9. The fuel fill system of claim 8, wherein each of the first and second angles is between about 30° to about 60°.

10. A funnel for a fuel fill system, the funnel comprising:
    an inlet port configured to receive a nozzle from an external fuel source; an outlet port through which fuel from the nozzle passes to a fuel filler tube; and a fuel vapor port configured to direct fuel vapor entering the funnel towards the outlet port; wherein the fuel vapor port has a centerline disposed at a first angle less than 90° from a longitudinal axis of the funnel; and wherein the fuel vapor port is further configured to direct the fuel vapor entering the funnel at a second angle less than 90° from a line tangent to an inner surface of the funnel at a point where the fuel vapor enters the funnel, the angle being in a plane perpendicular to the longitudinal axis of the funnel to introduce a swirl component in the fuel vapor around the inner surface of the funnel, which creates a low pressure region in the funnel to reduce the amount of fuel vapor that escapes the fuel fill system.

11. The funnel of claim 10, wherein the second angle is between about 20° to about 70°.

12. The funnel of claim 11, wherein the second angle is between about 30° to about 60°.

13. A funnel for a fuel fill system, the funnel comprising:
an inlet port configured to receive a nozzle from an external fuel source;
an outlet port through which fuel from the nozzle passes to a fuel filler tube; and
a fuel vapor port configured to direct fuel vapor entering the funnel at a first angle less than 90° from a line tangent to an inner surface of the funnel at a point where the fuel vapor enters the funnel, the angle being in a plane perpendicular to a longitudinal axis of the funnel to introduce a swirl component in the fuel vapor around the inner surface of the funnel, which creates a low pressure region in the funnel to reduce the amount of fuel vapor that escapes the fuel fill system.

14. The funnel of claim 13, wherein the fuel vapor port has a centerline disposed at the first angle.

15. The funnel of claim 14, wherein the centerline of the fuel vapor port is further disposed at a second angle less than 90° from the longitudinal axis of the funnel to direct the fuel vapor entering the funnel toward the outlet port.

16. The funnel of claim 15, wherein each of the first and second angles is between about 20° to about 70°.

17. The funnel of claim 16, wherein each of the first and second angles is between about 30° to about 60°.

* * * * *